United States Patent [19]
Deitrick

[11] Patent Number: 5,457,946
[45] Date of Patent: Oct. 17, 1995

[54] GRASS CATCHING ATTACHMENT FOR ROTARY LAWN MOWERS

[76] Inventor: Ned Deitrick, 714 Brent Rd., Rockville, Md. 20850

[21] Appl. No.: 149,385

[22] Filed: Nov. 9, 1993

[51] Int. Cl.⁶ .................................................. A01D 49/00
[52] U.S. Cl. ............................... 56/16.6; 56/194; 56/202; 56/203
[58] Field of Search ............................ 56/194, 195, 199, 56/200, 202, 203, 16.6, 13.3

[56] References Cited

U.S. PATENT DOCUMENTS

| | | | |
|---|---|---|---|
| 3,393,500 | 7/1968 | MacLeod et al. | 56/202 |
| 3,492,800 | 2/1970 | Peterson et al. | 56/202 |
| 3,925,968 | 12/1975 | Wagenhals | 56/13.3 |

*Primary Examiner*—Ramon S. Britts
*Assistant Examiner*—Pamela A. O'Connor
*Attorney, Agent, or Firm*—Stephen R. Greiner

[57] ABSTRACT

A grass catching attachment for use with a rotary lawn mower is disclosed. The attachment includes a flexible bag which has been adapted to expand the capacity of a rigid, grass catching receptacle frequently employed by commercial landscapers during mowing operations. The bag is fabricated from a number of specially shaped panels of durable fabric sewn together to form an elongated envelope having a generally curved configuration. The top and bottom panels of the bag include a narrowed and rearwardmost terminus positioned outside a rearward projection of either of the top or bottom panel's front edge thus allowing the distal end of the bag to be suspended directly beneath at least one of the mower handlebars. A rigid frame having a peripheral channel for engagement with brackets extending from the grass catching receptacle as well as for the receipt of a drawstring sewn into the flexible bag is provided for joining the bag and the rigid receptacle. A handle, fitted to the top of the frame, facilitates the mounting and removal of the bag.

13 Claims, 5 Drawing Sheets

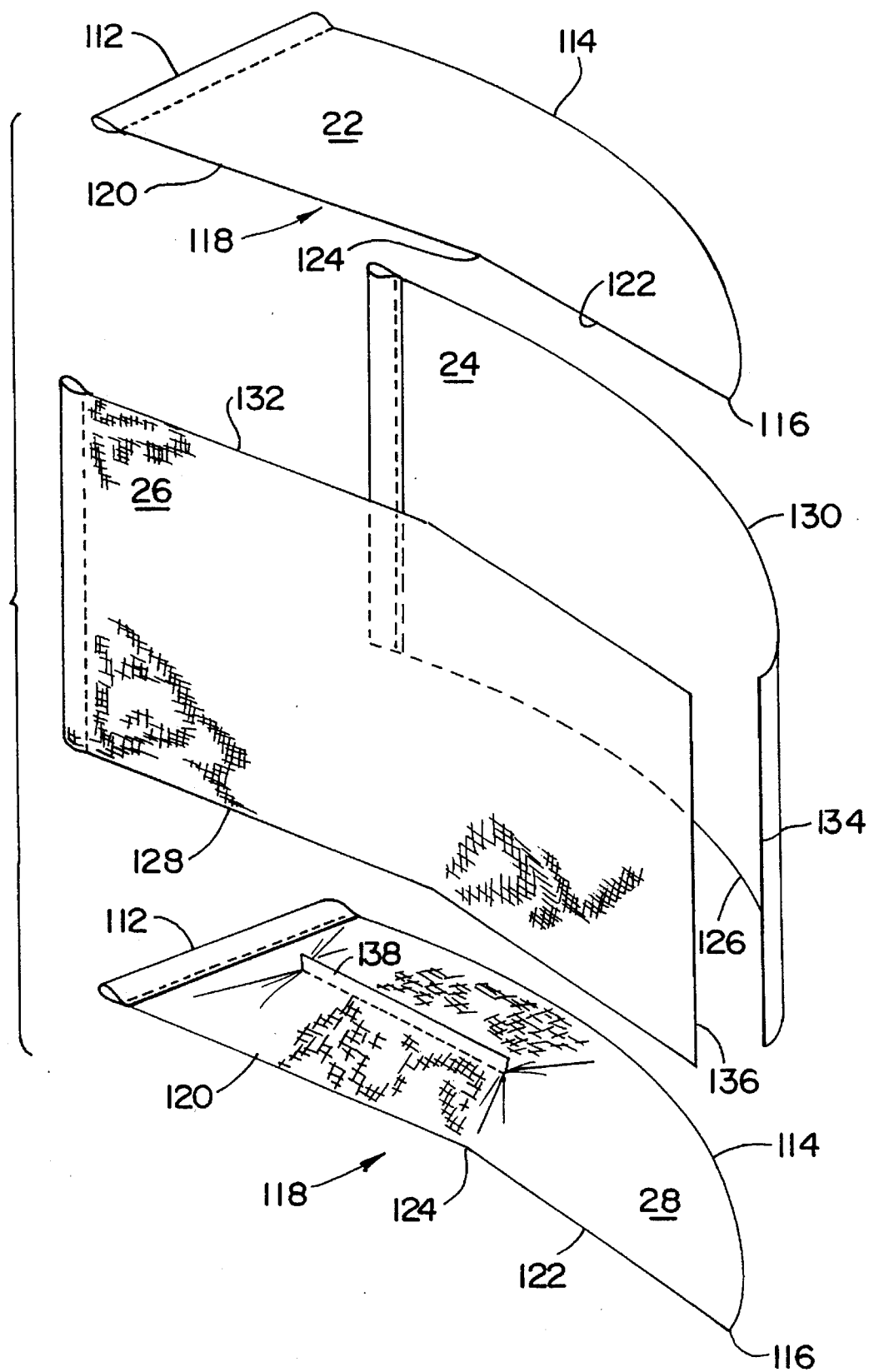

GRASS CATCHING ATTACHMENT FOR ROTARY LAWN MOWERS

FIELD OF THE INVENTION

The present invention relates generally to a high capacity grass catching attachment for use with a rotary lawn mower.

BACKGROUND OF THE INVENTION

Many individuals question whether to leave grass clippings on a lawn or to pick them up. There are certain advantages and disadvantages to leaving clippings on a lawn depending on grass type and level of maintenance. For instance, clippings return nutrients to a lawn. Some studies suggest that as much as one third of the nitrogen requirement of a lawn can be supplied by decaying grass clippings. Nevertheless, the woody, slow-to-decompose stems of warm-season grass blades like those of Bermudagrass contribute to thatch-a layer of slowly decomposing grass stems, roots, and debris that accumulates above the soil and chokes plant growth. Clippings of cool-season grass varieties such as Kentucky Bluegrass, on the other hand, do not cause or contribute to thatch when left on a lawn.

In certain situations it is reasonable to remove grass clippings from a lawn irrespective of the lawn's nutritional requirements. As is well known, decaying clippings of any grass type can present an unattractive appearance, and they are removed from well manicured lawns for this reason. Secondly, infrequent mowing generally causes too much grass to be cut at one time. If the clippings are not removed when generated, they may mat down and prevent light from reaching the growing grass blades thereby causing unintended harm. Further, some individuals collect grass clippings to use as compost or mulch in a garden bed. This, of course, is acceptable provided that the clippings are free of broadleaf herbicides.

Thus, in the field of lawn maintenance, it is recognized that advantages may be obtained by collecting the grass clippings produced during lawn mowing operations rather than depositing the clippings on a lawn. The simplest and most effective means of preventing the cut grass from remaining on a lawn is to collect the clippings during cutting operations rather than letting them be deposited on the lawn where later removal is often difficult. With the development of self-propelled mowers, however, the problem of efficient, temporary storage of these clippings has become severe as such mowers can mow substantially larger areas in a much shorter time than the manually propelled models of the past.

It is well known that the efficiency of a self-propelled mower is reduced due to the frequency with which it is necessary to stop the mower and empty its grass catcher. While typically not a major problem for the home gardener, the amount of time spent by commercial lawn maintenance crews in discharging collected grass clippings can have a great impact on profit and work output. Attempts to reduce the frequency of emptying the grass catcher by providing a larger storage bag were only partially successful since the increased weight of the collected grass clippings adversely affected the stability of the mower on hilly or uneven terrain. In short, the mowers with larger bags became far less maneuverable than those with smaller catchers and often performed their cutting task unevenly.

Much time has been devoted of late to developing lawn mowers employing grass catchers which may be mounted, dismounted, and emptied with a minimum of effort. The optimum catchers, it is believed, must be light in weight and compact in size so as to not interfere with the mower's normal operation. Further, they must be of large capacity and easily detachable for emptying purposes. Nonetheless, present catcher apparatus still fall short of achieving these aspirational goals. Considerable manipulation of various catcher components is often required to attach and detach the catcher to the mower and empty its contents. Conversely, catchers having suitable "quick release" mechanisms often suffer from being overweight and are likewise difficult to manipulate for this reason. Consequently, the emptying of a grass catching apparatus is usually a difficult and time-consuming task.

Often employed by commercial lawn maintenance crews in their mowing operations are rigid, grass-catching boxes capable of quick mounting upon their mowers. One such box, marketed as the "Grass Gobbler" by Lawn-Wright, Inc., of Gaithersburg, Md., has seen widespread use and copying in the industry because of its rugged structure and effective attachment means. Nonetheless, limited volume and heavy weight have narrowed the utility of the device. Attempts to increase volume through the addition of a detachable, rigid extension or "Leaf Gobbler" have met with limited success. The Leaf Gobbler suffers from heavy steel construction, relatively small capacity, and an inability to be easily or quickly emptied when filled. Furthermore, the bulky Leaf Gobbler has been cumbersome and obstructive during mowing operations, making mowing in close areas and under low hanging shrubbery difficult if not impossible.

As the prior art grass catchers have been deficient in one manner or another, it would be desirable to provide a grass catcher for use with a rotary lawn mower which is simple in design, light in weight, readily detachable from the mower and not obstructive to normal mowing operations. It is believed that this need may be satisfied best by providing a flexible bag adapted to expand the capacity and utility of the rigid grass catching boxes widely used by commercial lawn maintenance crews.

SUMMARY OF THE INVENTION

It is a principal object of the present invention to provide a simple, inexpensive, and highly efficient bag attachment for use with a rotary lawn mower, through the use of which a large volume of grass clippings may be collected and disposed of in a quick and easy fashion.

Another object of the invention is to provide a high-capacity, flexible collection bag, adapted for ready attachment to a rotary lawn mower, supported in a low-hanging, partially trailing position adjacent the mower housing, extending longitudinally of the line of mower travel and not interfering with edge trimming or cutting below low-hanging shrubbery.

It is a further object of the present invention to provide an apparatus for catching grass clippings or the like upon being ejected from the discharge outlet of a rotary lawn mower including: a receptacle of rigid construction, adapted for removable attachment to a rotary lawn mower, having at least one perforated wall surface for allowing air, but not grass clippings, to pass therethrough and defining a storage space for accumulating grass clippings; an elongated, flexible bag removably fastened to the receptacle for extending the grass-catching capacity of the receptacle; and, a rigid frame secured to the bag for retaining the bag's mouth in an open configuration at the outlet opening of the receptacle.

Still another object of the invention is to provide a grass catching apparatus with a perforated and nozzle-like receptacle whose cross-sectional area is greatest proximate its outlet opening and smallest proximate its inlet opening for directing grass clippings to a flexible bag removably fastened to the outlet opening with a minimal frictional loss for improved packing of the temporarily stored clippings within the bag.

It is a further object of the invention to provide a grass catching apparatus with a bag constructed from a plurality of panels of a flexible, plastic, polymer laminate material for long wear.

It is another object of the invention to provide a grass catching apparatus with improved stability by configuring each of the top and bottom panels of its flexible bag with: a substantially linear front edge; a narrowed terminus remote from the front edge and external to a rearward projection of the front edge; a curved outer edge extending rearwardly from the front edge to the terminus for providing each panel with a convex surface; and, an inner edge opposite the outer edge, defined by two lines diverging from a common point at an obtuse angle, connecting the terminus with the front edge for providing the top and bottom panels with a concave surface.

It is an additional object of the present invention to provide an apparatus for catching grass clippings wherein the bottom panel of its flexible bag has a central pleat defining an upwardly directed furrow for preventing the bag from contacting the ground surface under a full load of grass clippings.

It is a further object of the invention to provide an apparatus for catching grass clippings wherein the central pleat of the flexible bag's bottom panel is remote from the panel's front edge as well as its narrowed terminus and is disposed midway between the bag's side panels for maximizing the height of the furrow.

It is another object of the instant invention to provide an apparatus for catching grass clippings with a rigid frame constructed from a plurality of frame members wherein the U-shaped cross section of each of the frame members defines a channel about the periphery of the frame for receiving the mouth of a flexible bag so as to hold the bag open at the outlet opening of a rigid grass catching receptacle.

Another object of the present invention is to provide a grass catching apparatus with means for supporting the closed end of a flexible bag from a rotary lawn mower, said means including: a flexible strap joined to the bottom panel of the bag, and at least one hook secured to the distal end of the flexible strap and adapted for engagement with the handlebars of a lawn mower.

It is an object of the invention to provide improved elements and arrangements thereof in an apparatus for catching grass clippings ejected from the discharge outlet of a rotary lawn mower which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a perspective view of the flexible bag, exploded to show details thereof.

Similar reference characters denote corresponding features consistently throughout the attached drawings.

DETAILED DESCRIPTION OF THE PREFERRED EMBODIMENT

Figure 1:
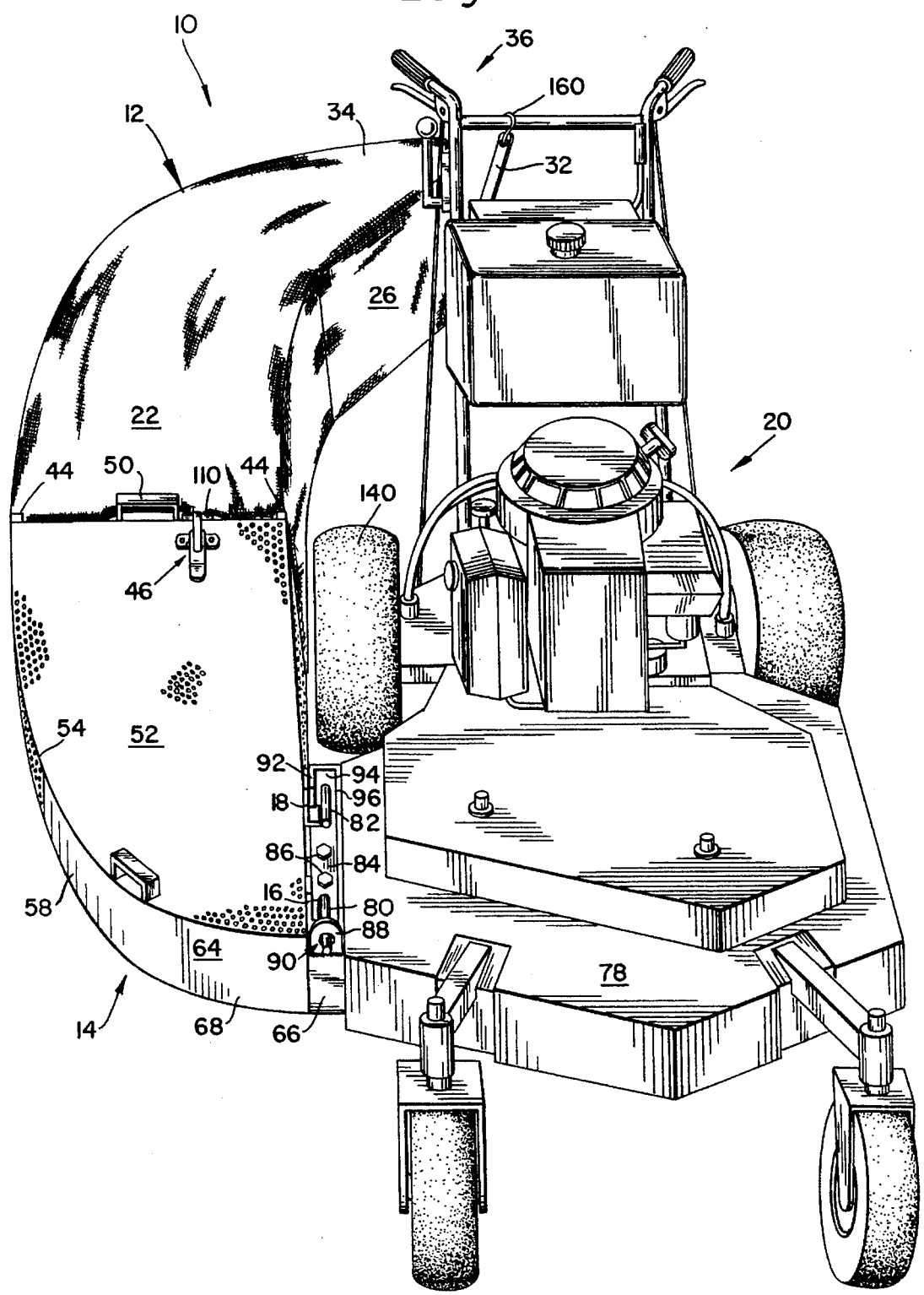
FIG. 1 is a perspective view of a grass catching attachment in accordance with the present invention positioned upon a well-known rotary power mower.

Referring now to the figures, a grass catching attachment for use with a rotary lawn mower in accordance with the present invention is disclosed by way of example only. The attachment, generally indicated at 10, includes a flexible bag 12 removably secured to a grass catching receptacle 14 of rigid construction for enlarging the capacity thereof. Support arms 16 and 18, extending from the side of grass catching receptacle 14, fasten such to rotary lawn mower 20. Bag 12, including a number of specially configured panels 22, 24, 26, and 28 of durable sheet material sewn together, form an elongated envelope having an inlet opening or mouth 30 for receiving grass clippings at one of its ends. Opposite opening 30, a strap 32 is provided for suspending the distal end 34 of bag 12 from a handlebar 36 extending from the back of mower 20. Fitted within the opening 30 is a rigid frame 38 having a peripheral channel 40 for engagement with brackets 42 and angled supports 44 extending from the rear of grass catching receptacle 14. A manually operable clamp 46 retains the frame 38 in a fixed side-by-side relationship upon receptacle 14. Channel 40 also receives a drawstring 48 sewn within bag 12 about opening 30 which securely joins bag 12 and frame 38 together. A handle 50 fitted to the top of frame 38 facilitates the mounting and removal of the bag 12 on receptacle 14.

The receptacle 14 is generally known in the art and is assembled from a number of inflexible walls joined together to form a rigid, box-like structure. Upper wall 52, having a first semicircular edge 54, and lower wall 56, having a second semicircular edge 58, define the top and bottom of receptacle 14, respectively. An inner side wall 60, including inlet opening 62 and connecting upper wall 52 to lower wall 56, defines the side of receptacle 14 positioned directly adjacent mower 20. An outer side wall 64, opposite inner side wall 60 and connecting first semicircular edge 54 to second semicircular edge 56, defines the curved side of receptacle 14 positioned away from mower 20 during use.

Figure 2:
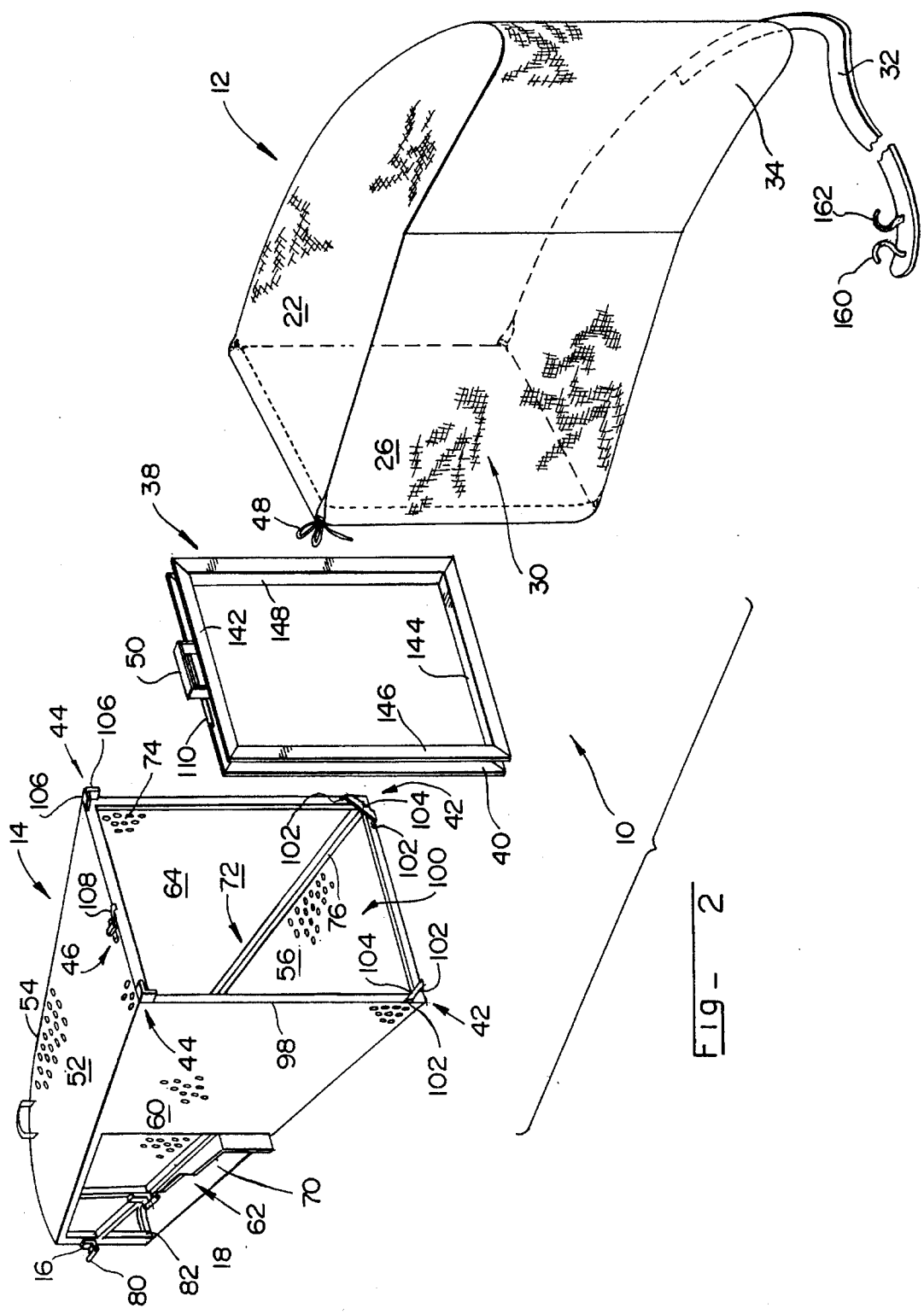
FIG. 2 is a perspective view of the grass catching attachment of FIG. 1, exploded to show details thereof.

The nozzle-like configuration of receptacle 14 directs grass clippings to bag 12 with a minimal frictional loss for improved packing of the temporarily stored clippings within bag 12. As can be seen in FIGS. 1 and 2, upper and lower walls 52 and 56 increase in width away from their respective front ends, proximate rectangular inlet 62 through which clippings are received from associated lateral discharge outlet 66 of rotary lawn mower 20. Additionally, upper and lower walls 52 and 56 are generally flat and lay in planes diverging from one another so that the cross-sectional area of receptacle 14 increases toward its rear. Thus, because of well-known fluid dynamics principles, receptacle 14 receives the cut grass as it is ejected from mower 20 and directs such toward the rearwardly-disposed, flexible bag 12 with minimal loss in air velocity and entrainment of suspended matter.

Receptacle 14 is provided with a heavy, all-metal construction with perforated and imperforate metal sheet playing a large role. A curved deflector plate 68 is fabricated of sheet metal of sufficient thickness to withstand occasional high velocity impacts from heavy projectiles jettisoned from the mower's blades (not shown). Deflector plate 68 forms the forwardmost portion of outer side wall 64, positioned opposite inlet 62. Further, floor 70, immediately adjacent inlet 62 is also fabricated from high strength metal sheet. The clippings storage space 72 of receptacle 14 positioned generally rearward of inlet 62, however, is bounded by a plurality of walls fabricated from perforated metal sheet, as at 74, reinforced by a skeleton of metallic box beams or other suitable supporting members partially seen at 76. The individual perforations in the metal sheet have an effective diameter of approximately 3/16 inches (4 millimeters), suitable for retaining grass clippings yet sufficiently large so as to allow the passage of air without clogging by smaller pieces of lawn debris. It is believed, however, that other materials such as screening or expanded metal may be substituted for the perforated sheet material without adversely impacting upon the grass clipping discharge and collection functions of the receptacle.

While the prior art is repleat with attempts at using high strength textiles in grass catching bags most of these attempts have less than optimal results as the large vents is frequently employed for the escape of air ejected substantial volumes of air-entrained grass clippings from the bag. The perforated metal sheeting of the rigid receptacle 14 has been discovered, however, to permit the use of high strength textiles in fabricating flexible bag 12 while avoiding the substantial loss of grass clippings during use which has heretofor plagued the prior art. Air easily vents through the perforations in receptacle 14 while grass clippings are retained therein.

Without the perforations, bag 12 would instantaneously fill with high pressure air discharged by mower 20 and the back pressure would prevent entry of grass thereto. Although it is believed that perforating bag 12 itself would alleviate the problem somewhat, in the absence of a receptacle 14, the deposited clippings would clog the perforations after a short period thereby frustrating further entry of material into bag 12. Additionally, perforations in the textiles often employed in flexible, grass-catching bags have been found to weaken the structures assembled therefrom. Such perforations lead to tears and snags upon sharp objects frequently encountered in out-of-doors environments, greatly reducing the serviceable life of the object manufactured from such a material. Thus, a synergism, in terms of longer bag life and greater grass retention, is achieved by the combination of the perforated receptacle and the imperforate high-strength bag material.

Receptacle 14 is adapted for removable attachment to rotary lawn mower 20 at the lateral discharge outlet 66 of mower blade housing 78. Attachment of the receptacle 14 is accomplished by the insertion of longitudinally disposed pins 80 and 82, at the distal ends of support arms 16 and 18 which are generally L-shaped metallic brackets, into channel member 84 secured to side discharge outlet 66 by threaded fasteners such as bolts 86. During insertion, forwardly disposed pin 80 is moved into mated engagement with key flange 88 at the front of the channel member 84 whereby pin 80 is fitted within a bore 90 in key flange 88 of sufficient diameter so as to snugly accept pin 80 therein. Pin 82 extending from rearwardly positioned support arm 18 is retained by gravity between three walls 92, 94, and 96 projecting upwardly from the base of channel member 84. In addition to providing a temporary and readily removable clippings storage space for accumulated grass clippings, the effect of receptacle 14 is to extend the actual mower outlet to a position facing rearwardly toward the operator rather than laterally so that bag 12 extends generally rearwardly rather than laterally.

Figure 3:
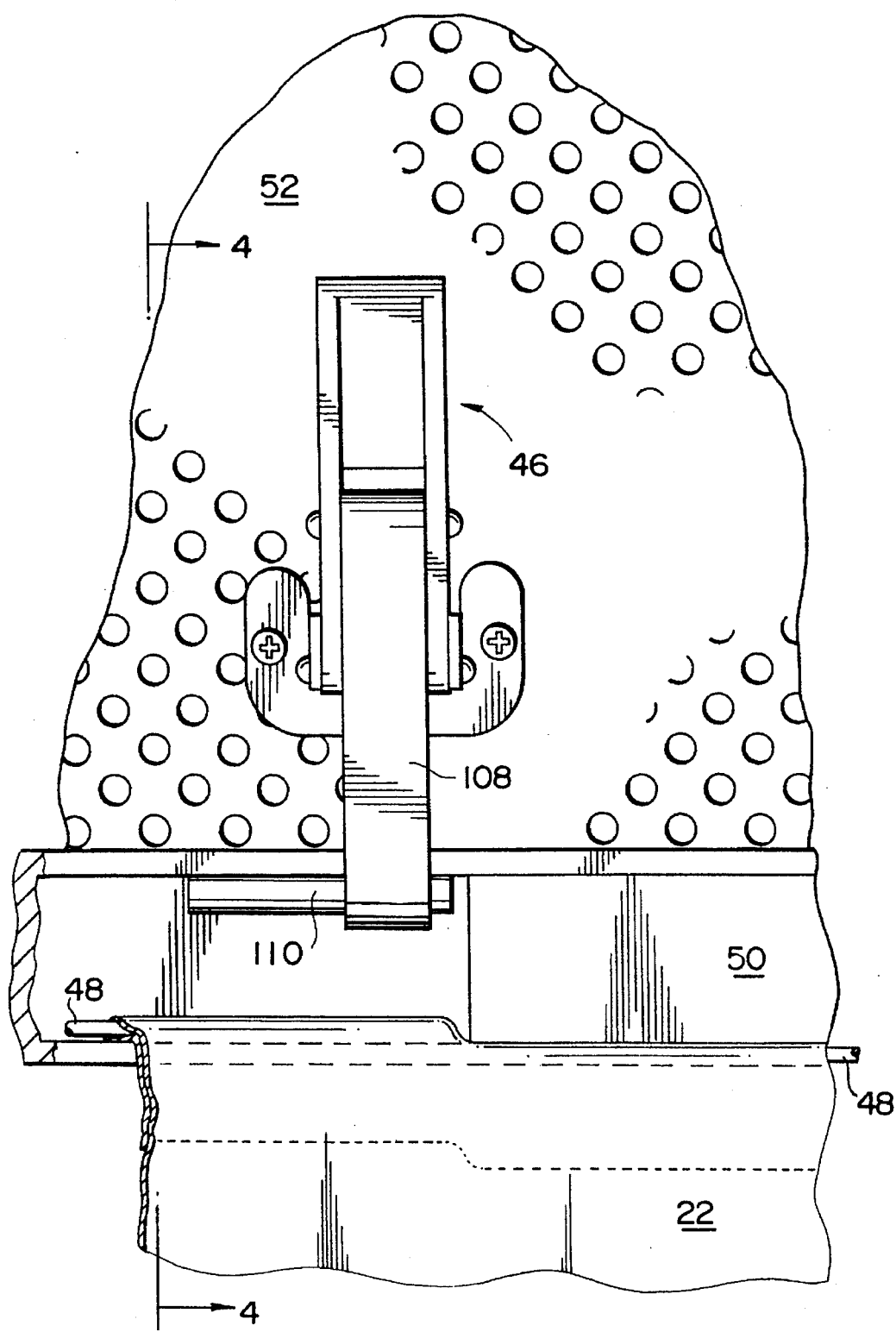
FIG. 3 is a fragmentary top view of the attachment showing its clamp structure.
Figure 4:
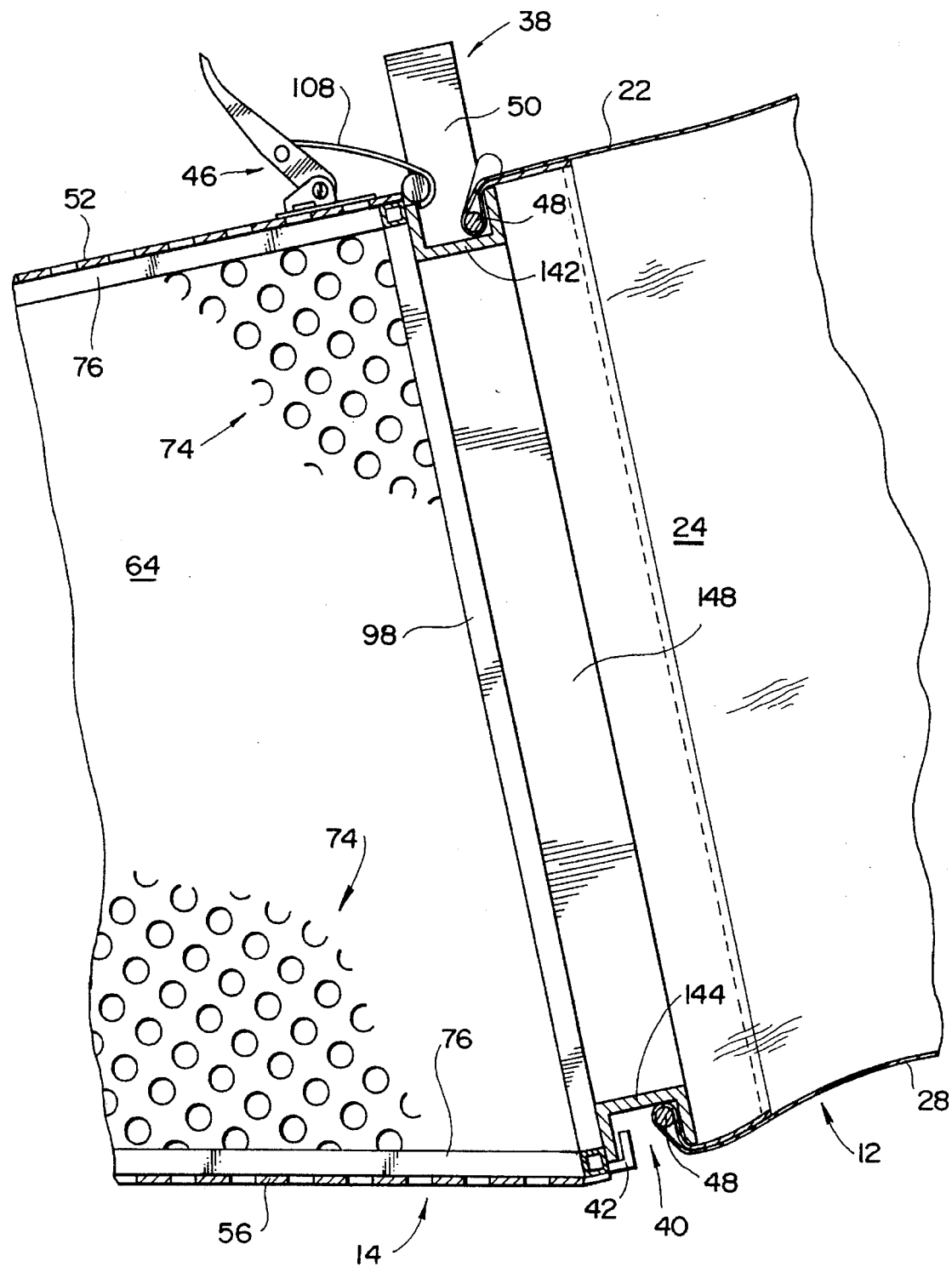
FIG. 4 is a cross-sectional view of the grass catching attachment taken along line 4—4 of FIG. 3.

A substantially rectangular rim 98, being part of the receptacle's reinforcing skeleton 76, defines an outlet opening 100 in receptacle 14 for discharging clippings therefrom. Joined to each of the bottom two corners of rim 98 is a bracket 42 for keeping bag 12 in place upon receptacle 14 during use. Each bracket 42 includes ridge or edge portions 102, each projecting rearwardly from the side and bottom of rim 98 in a spaced apart relationship capable of allowing the ready passage of fouling grass clippings and other lawn debris therebetween. Connecting the edge portions 102 together at a set distance from rim 98 is a narrow strip of rigid material 104, forming a holder or fastener into which rigid frame 38 may be slidably positioned. Joined to each of the upper two corners of rim 98, on the other hand, are angled supports 44 for preventing the lateral movement of frame 38 when positioned therebetween. Each support 44 includes ridge or edge portions 106 projecting rearwardly from the side and top of rim 98 and diverging from a common corner point. As may be seen in FIGS. 3 and 4, positioned between supports 44 atop receptacle 14 is a clamp 46, of well-known construction, for securely holding frame 38 upon receptacle 14. The C-shaped extensible arm 108 of the clamp 46 hooks upon projection 110 joined to, and extending laterally along, the top of frame 38. Thus, the outlet end of receptacle 14 supports bag 12.

Bag 12 is elongated in shape and possesses a generally rectangular cross section which decreases in size toward its rearward end. Bag 12 is of unique construction and is assembled from four flexible sheets or panels: side panels 24 and 26, top panel 22, and bottom panel 28, best seen with reference to FIG. 5. The spaced-apart top and bottom panels 22 and 28 lay in generally parallel, horizontal planes whereas the side panels 24 and 26 are generally vertically disposed. While side panels 24 and 26 resemble elongated rectangles in their unfolded or unbent state, top panel 22 and bottom panel 28 have a curved and somewhat semicircular configuration when similarly positioned. Each of panels 22 and 28 includes a substantially linear front border or edge 112 for placement proximate frame 38. A continuously bending or curved, outer edge 114, extends rearwardly from front edge 112 to a narrowed terminus 116 at the rearwardmost point of each panel 22 and 28, thus establishing the shape of the outer surface of bag 12 as being convex. While outer edge 114 is convex in shape, bulging and curved like a circle when viewed from without, opposing, inner edge 118 establishes a concavity in the respective panel surfaces between terminus 116 and front edge 112. More particularly, inner edge 118, defined by two lines 120 and 122 diverging from a common point 124 at an obtuse angle, connects terminus 116 with front edge 112. Thus, the added lengths of front edge 112, outer edge 114, and inner edge 118 establish the perimeter of both panels 22 and 28.

As may be seen in FIG. 2, side panels 24 and 26 have their bottom edges 126 and 128 connected, respectively, to the curved outer edge 114 and inner edge 118 of bottom panel 28. Side panels 24 and 26, on the other hand, have their top edges 130 and 132 connected, respectively, to the curved outer edge 114 and inner edge 118 of top panel 22. Proximate narrowed terminus 116, side panels 24 and 26 have their side edges 134 and 136 connected together. Thus, bag 12 is provided with an open mouth 30 proximate front edge 112 for receiving grass clippings and a closed end 34 proximate narrowed terminus 116 for retaining the clippings within the bag 12.

The bottom panel 28, having an initial shape substantially identical to that of top panel 22, has a central fold or pleat 138 to prevent panel 28 from being bent excessively downward by weight or pressure during use and contacting the ground surface. The pleat 138 runs substantially parallel to the longitudinal axis of bag 12, midway between side panels 24 and 26. Pleat 138 is remote from front edge 112 and narrowed terminus 116, beginning several inches (centimeters) from front edge 112 and ending opposite point 124, thus spanning the area where the heaviest loads may be anticipated. The pleat 138, of even width, is made by doubling a portion of the panel material upon itself and stitching or otherwise fastening it into place thereby forming a shallow, upwardly directed furrow which is reinforced by the doubled material and is resistant to downward deflection under load. It is of note that the addition of pleat 138 to bottom panel 28 reduces the lateral extent of the panel such that it is somewhat smaller than top panel 22.

The configuration of bag 12 provides several important advantages over those seen in the prior art. Because the narrowed terminus 116, at the rearwardmost point of panels 22 and 28, is external to a rearward projection of front edge 112, a portion of bag 12 may be suspended directly beneath the mower's handlebars 36 rather than being positioned lateral thereto as has been done in the past. It has been found that suspending a portion of the bag 12 beneath handlebars 36 increases the stability of mower 20 during use and limits the "footprint" of the mower and attachment 10 for increased mobility in confined lawn areas. The curved outer edge of panels 22 and 28 reduces the likelihood of the bag becoming snagged upon, or otherwise encumbered by, low hanging shrubbery. Further, the angled inner edge 118 of panels 22 and 28 permits the bag to fit closely against mower housing 78, for maximum storage volume, yet provide clearance for the mower wheel 140.

In its preferred form, each of panels 22, 24, 26, and 28 is fabricated from a plastic, polymer, laminate material. One suitable laminate material is marketed under the brand name "Poly Tarp" and distributed in the United States by Dize Co., of Winston-Salem, N.C. In addition to being extremely durable, the Poly Tarp material is relatively lightweight, mildew and rot proof, waterproof, resistant to degradation by ultraviolet radiation, and withstands prolonged exposure to most chemicals. The material is also substantially impervious to air. In the preferred embodiment, the various panels are sewn together for strength. Nevertheless, it is believed that the seams joining panels of the Poly Tarp material may be formed by melting or heat-sealing the panels to one another.

In alternative embodiments of the instant invention, the discharge of air from the interior of the bag may be facilitated by fabricating at least one of panels 22, 24, 26, and 28 from a loosely woven, mesh material. Preferably, the porous material would be disposed on the top of the flexible bag 12 limiting the possibility for damage thereto. It should be understood, however, that one or more of the side panels might also be made of the porous material. Indeed, all of the panels might be so constructed.

The forward end of the flexible bag 12 is provided with a large inlet opening or mouth 30 for easy discharge of grass clippings therefrom. To maintain the inlet opening or mouth 30 of bag 12 in its fully open position, a substantially rectangular, rigid frame 38 is employed. Frame 38 is assembled from a plurality of frame members each having a U-shaped cross section: top frame member 142, bottom frame member 144, and side frame members 146 and 148. Top frame member 142 and bottom frame member 144 lay in a substantially horizontal plane, while side frame members 146 and 148 each lay in a substantially vertical plane. When assembled, the bottom edges of side frame members 146 and 148 are connected, respectively, to the side edges of the bottom frame member 144, and the top edges of side frame members 146 and 148 are connected, respectively, to the side edges of top frame member 142. A handle 50, joined to top frame member and extending vertically therefrom, provides for the manual manipulation of rigid frame 38.

The U-shaped cross section of each of frame members 142, 144, 146, and 148 defines a channel about the periphery of frame 38 for receiving the mouth 30 of bag 12 to hold it at the outlet opening of receptacle 14. A drawstring 48 fitted within a sewn pocket provided in the forwardmost portion of each of panels 22, 24, 26, and 28 secures the bag 12 to frame 38. Once the drawstring 48 is positioned within channel 40 and drawn tight, the inlet opening of frame 38 effectively defines mouth 30 of the flexible bag 12. It should be apparent that by utilizing a bag having an essentially unrestricted mouth 30, grass clippings may be removed from the bag very easily.

To attach flexible bag 12 to lawn mower 20, it is simply necessary to place the lower edge of the frame 38 in the lower channel-shaped bends of support brackets 42. The upper edge of the frame 38 is then positioned between the angled supports 44 arranged thereabove so that frame 38 is in substantially surface-to-surface abutting contact with rim 98. The frame 38 is dimensioned to fit snugly into brackets 42 where it is retained, perfectly aligned and resistant to detachment by angled supports 44 and clamp 46.

When joined, receptacle 14 and bag 12 form a continuous and streamlined repository offering the least possible resistance to the volumes of air passing therethrough and capable of being completely filled with grass clippings. As can best be seen in FIG. 2, the cross sectional area of the flexible bag 12 is several times that of the inlet 62 of receptacle 14. It has been found that the tapered, nozzle-like configuration of receptacle 14, which gradually opens away from inlet 62, maximizes the distance to which the grass clippings may be propelled. Thus, with the receptacle 14 shown in the preferred embodiment it is possible to transport the grass clippings all the way to the distal end 34 of the bag 12 remote from mouth 30.

It is necessary to fill bag 12 from its rear forward if it is to be completely filled without need of the operator having to rearrange the clippings during mowing operations. Adequate throw of the clippings is assured by maintaining the air which carries the clippings at a high velocity. Although the nozzle-like shape of receptacle 14 assists in maintaining the air velocity at an adequate level by minimizing frictional losses, for continued air movement within attachment 10, means are necessitated for allowing air to quickly escape from the bag 12 without buildup of pressure therein. The perforations provided in the walls of receptacle 14 serve this function. The substantial size of the mouth 30, as compared to the rectangular inlet 62 of receptacle 14, permits a substantial amount of air to be discharged back through the mouth of the bag 12. The large mouth 30 and frame member 38 also facilitate the emptying of grass clippings which have accumulated within bag 12.

The closed, rearward end 34 of the flexible bag 12 is supported by means of a flexible strap 32 adapted to be secured to a handlebar 36 of mower 20. The inner end of strap 32 is joined to the bottom panel 28 of flexible bag 12 along semicircular edge 114. It has been found that this positioning of strap 32 adequately supports bag 12 when filled, without excessive sag or resort to the stiffeners or wheeled supports of the prior art. The distal end of the strap 32 is fitted with hooks 160 and 162, each of which are adapted to be selectively engaged and suspended from handlebars 36.

Since it is frequently desirable to remove the entire grass catching attachment 10 from the lawn mower 20 when additional trimming is to be performed with the mower in a congested area, it is desirable that disassembly may be accomplished rapidly. With the instant invention it is necessary only to remove pins 80 and 82 from engagement with channel member 84 by lifting receptacle 14 generally upward and withdraw hook 160 or 162 from engagement with handlebars 36. It should also be appreciated that the detachment of bag 12 alone for emptying its accumulated grass clippings when the bag 12 is full is very simple, requiring only the unfastening of clamp 46, disengagement of frame 38 from brackets 42, and the removal of hook 160 or 162 from handlebar 36. Clippings are removed from bag 12 through the mouth of bag 12 defined by frame 38.

While there has been illustrated and described what at the present is the preferred embodiment of the present invention, it is believed that numerous changes and modifications will readily occur to those skilled in the art. It is to be understood, therefore, that the present invention is not limited to the sole embodiment described above, but is aimed to cover any and all such changes and modifications, and encompasses any and all embodiments within the spirit and scope of the following claims.

I claim:

1. An apparatus for catching grass clippings or the like upon being ejected from the discharge outlet of a rotary lawn mower, comprising:

a receptacle of rigid construction, adapted for removable attachment to a rotary lawn mower, having at least one perforated wall for allowing air, but not grass clippings, to pass therethrough and defining a storage space for accumulating grass clippings, said receptacle also having an inlet opening, adapted for association with the lateral discharge outlet of a rotary lawn mower so as to receive grass clippings therefrom, and further having an outlet opening for discharging the clippings;

an elongated, flexible bag removably fastened to said receptacle in a generally horizontal grass-catching position, said bag having an open mouth at one of its ends for receiving grass clippings and a closed end opposite said mouth, said elongated bag including:
   a top panel;
   a bottom panel;
   a first side panel;
   a second side panel;
   each of said top and said bottom panels including:
      a substantially linear front edge;
      a narrowed terminus remote from said front edge and external to a rearward projection of said front edge;
      a curved outer edge extending rearwardly from said front edge to said terminus for providing each of said top and said bottom panels with a convex surface;
      an inner edge opposite said outer edge, defined by two lines diverging from a common point at an obtuse angle, connecting said terminus with said front edge for providing each of said top and said bottom panels with a concave surface;

said top and bottom panels each lying in a generally horizontal plane, said side panels being generally vertically disposed;

said first side panel and said second side panel having their bottom edges connected, respectively, to said curved outer edge and said inner edge of said bottom panel;

said first side panel and said second side panel having their top edges connected, respectively, to said curved outer edge and said inner edge of said top panel; and, said first side panel and said second side panel having their respective side edges connected proximate said narrowed terminus whereby said bag is provided with an open mouth proximate said front edge for receiving grass clippings and a closed end proximate said narrowed terminus; and, a rigid frame secured to said bag for retaining said mouth in an open configuration at said outlet opening of said receptacle;

whereby air entering said receptacle with relatively high velocity and carrying grass clippings is propelled through said receptacle and passes into said elongated bag where it reverses course, depositing such clippings at the rear of said bag, and is then exhausted through said perforated wall surface.

2. The grass catching apparatus according to claim 1 wherein each of said top, bottom, and side panels is comprised of a plastic, polymer, laminate material.

3. The grass catching apparatus according to claim 1, wherein said bottom panel has a central pleat defining an upwardly directed furrow for preventing said bottom panel from contacting the ground surface under load.

4. The grass catching apparatus according to claim 3 wherein said central pleat is remote from said substantially linear front edge and said narrowed terminus and is disposed midway between said first side panel and said second side panel.

5. The grass catching apparatus according to claim 1 further comprising:
   means for supporting said closed end of said bag from a rotary. lawn mower, said means including;
   a flexible strap joined to said bottom panel; and,
   at least one hook secured to the distal end of said flexible strap adapted for engagement with the handlebars of a lawn mower.

6. A grass catching bag for use with a rotary lawn mower, comprising:
   a top panel;
   a bottom panel;
   a first side panel;
   a second side panel;
   each of said top and said bottom panels including:
      a substantially linear front edge;
      a narrowed terminus remote from said front edge and external to a rearward projection of said front edge;
      a curved outer edge extending rearwardly from said front edge to said terminus for providing each of said top and said bottom panels with a convex surface;
      an inner edge opposite said outer edge, defined by two lines diverging from a common point at an obtuse angle, connecting said terminus with said front edge for providing each of said top and said bottom panels with a concave surface;
   said top and bottom panels each lying in a generally horizontal plane, said side panels being generally vertically disposed;

said first side panel and said second side panel having their bottom edges connected, respectively, to said curved outer edge and said inner edge of said bottom panel;

said first side panel and said second side panel having their top edges connected, respectively, to said curved outer edge and said inner edge of said top panel; and, said first side panel and said second side panel having their respective side edges connected proximate said narrowed terminus whereby said bag is provided with an open mouth proximate said front edge for receiving grass clippings and a closed end proximate said narrowed terminus.

7. The grass catching bag according to claim 6 wherein each of said top, bottom, and side panels is comprised of a plastic, polymer, laminate material.

8. The grass catching bag according to claim 6 wherein said bottom panel has a central pleat defining an upwardly directed furrow for preventing said bottom panel from contacting the ground surface under load.

9. The grass catching bag according to claim 8 wherein said central pleat is remote from said substantially linear front edge and said narrowed terminus and is disposed midway between said first side panel and said second side panel.

10. The grass catching bag according to claim 6 further comprising:

a rigid frame secured to said bag for retaining said mouth in an open configuration, said rigid frame including:

a top frame member;

a bottom frame member;

a first side frame member;

a second side frame member;

said top, bottom, and side frame members having a U-shaped cross section;

said top and bottom frame members each lying in a substantially horizontal plane, said side frame members each lying in a substantially vertical plane; and, said first and second side frame members having their bottom edges connected, respectively, to the side edges of said bottom frame member, said first and second side frame members having their top edges connected, respectively, to the side edges of said top frame member;

whereby the U-shaped cross section of each of said frame members defines a channel about the periphery of said frame for receiving said mouth of said bag to hold it open.

11. The grass catching bag according to claim 10 further comprising:

a drawstring attached to said top, bottom, and side panels about the mouth of said bag, said drawstring of a size enabling such to tightly encircle and grasp said channel about the periphery of said frame whereby said bag can be positioned and mounted upon said frame.

12. The grass catching bag according to claim 6 further comprising:

a handle joined to said top frame member for manual manipulation of said rigid frame.

13. The grass catching bag according to claim 6 further comprising:

means for supporting said closed end of said bag from a rotary lawn mower, said means including;

a flexible strap joined to said bottom panel; and, at least one hook secured to the distal end of said flexible strap adapted for engagement with the handlebars of a lawn mower.

* * * * *